United States Patent [19]
Danziger et al.

[11] Patent Number: 6,134,259
[45] Date of Patent: Oct. 17, 2000

[54] OPTICAL RESONATOR WITH SPIRAL OPTICAL ELEMENTS

[75] Inventors: Yochay Danziger, Rishon LeZion; Erez Hasman, Kiryat Ono; Nir Davidson, Rishon LeZion, all of Israel

[73] Assignee: Yeda Research and Development Co., Ltd., Rehovot, Israel

[21] Appl. No.: 09/142,626

[22] PCT Filed: Feb. 18, 1997

[86] PCT No.: PCT/IL97/00064

§ 371 Date: Dec. 23, 1998

§ 102(e) Date: Dec. 23, 1998

[87] PCT Pub. No.: WO97/34344

PCT Pub. Date: Sep. 18, 1997

[30] Foreign Application Priority Data

Mar. 14, 1996 [IL] Israel .................................. 117503

[51] Int. Cl.[7] .................................................. H01S 3/08
[52] U.S. Cl. ...................... 372/99; 372/99; 372/19; 372/9; 372/28; 372/29; 372/32; 372/92; 372/98; 372/108; 307/88; 307/3
[58] Field of Search ..................... 372/9, 19, 28, 372/29, 32, 92, 98, 99, 108; 307/88.3

[56] References Cited

U.S. PATENT DOCUMENTS 4,088,898  5/1978  Stitch .......................... 307/88.3
5,283,796  2/1994  Fink ............................ 372/32

OTHER PUBLICATIONS

A.E. Siegman, SPIE vol. 1224 Optical Resonators, pp. 2–14, 1990.

A.G. Fox et al., Bell System Technical Journal, 40:453–488, 1961.

H. Kogelnik et al., Proc. of the IEEE, 54, 54:1312–1328, 1966.

P.A. Belanger et al., Optics Letters, 17:739–741, 1992

L.W. Casperson et al., Optics Communications, 21:1–4, 1977.

A.E. Siegman, Optics Letters, 18:675–677, 1993.

E. Hasman et al, Optics Letters, 16:423–425, 1991.

N. Davidson et al., Applied Optics, 31:1067–1073, 1992.

*Primary Examiner*—Frank G. Font
*Assistant Examiner*—Delma R. Flores Ruiz
*Attorney, Agent, or Firm*—Darby & Darby

[57] ABSTRACT

This invention discloses an optical resonator (24) including at least one spiral optical element (44) operative to change the angular phase distribution of modes in the optical resonator (24), thereby to generally eliminate undesirable modes.

27 Claims, 14 Drawing Sheets

132
130

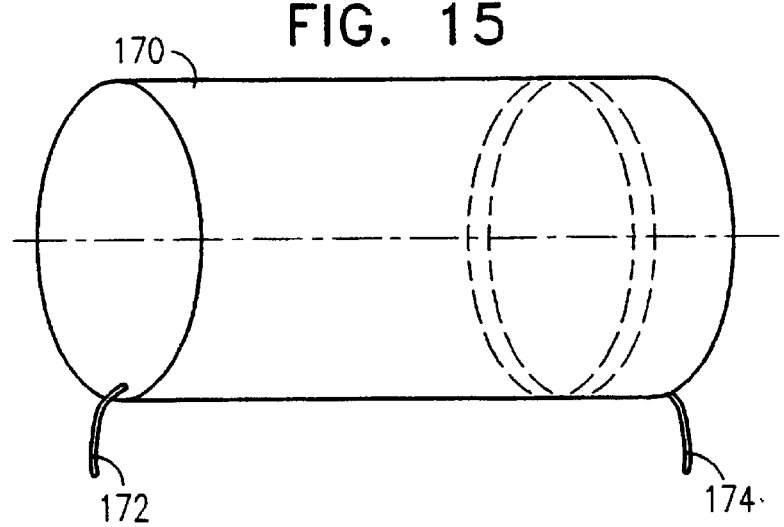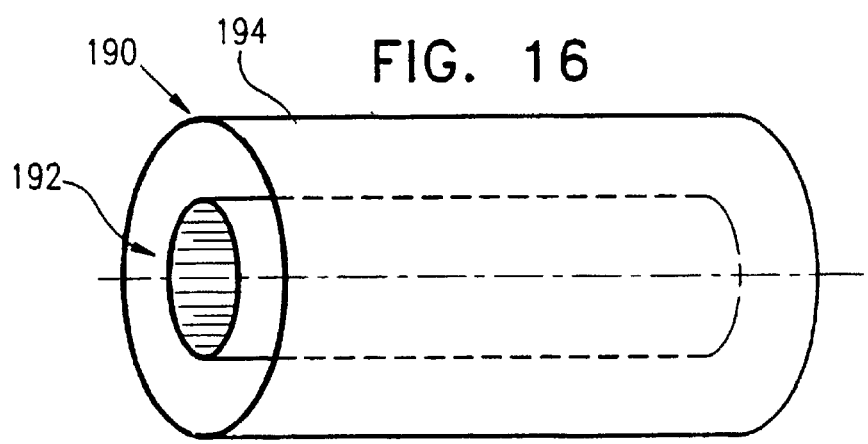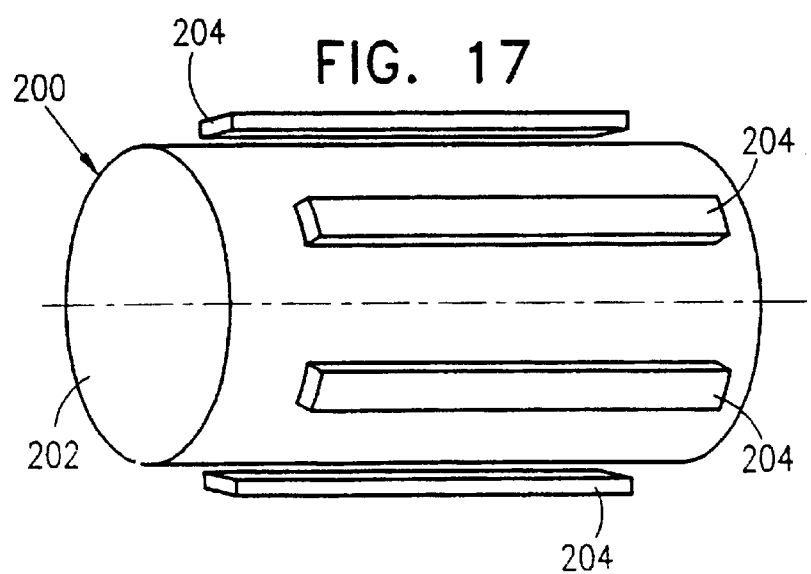

OPTICAL RESONATOR WITH SPIRAL OPTICAL ELEMENTS

FIELD OF THE INVENTION

The present invention relates to lasers and optical resonators.

BACKGROUND OF THE INVENTION

In general, it is desirable that lasers be compact in size while, at the same time, producing a high power, high quality output beam. Unfortunately, in many laser systems such desired requirements cannot all be fulfilled simultaneously, so design compromises must be made.

The characteristics of the output beam depend on the distribution of the light inside the optical resonator of the laser. The light inside an optical resonator is distributed in well defined patterns termed modes.

The optical quality of the output beam from an optical resonator is determined by its divergence, which differs for each mode within the resonator. The highest quality output beam has the least divergence.

A parameter which provides a quantitative measure for the output beam is called $M^2$. This parameter is described in A. E. Siegman, New developments in laser resonators, SPIE Vol. 1224, 2–14 (1990), the disclosure of which is hereby incorporated by reference.

The optimal shape of the output beam with the least divergence is the Gaussian shape, where $M^2=1$. Output beams with larger $M^2$ parameters have greater divergence, so their resulting beam quality is inferior. If only a single mode is present inside the resonator, then the output beam from the resonator can be improved by placing outside the optical resonator a compensating optical element, designed especially to improve the divergence for that mode.

The field distribution of the modes affects the power of the beam emerging from the resonator. One of the most common ways to describe this field distribution is using a cylindrical representation as described in the following publications:

A. G. Fox and T. Li, Resonant modes in an optical maser, Bell Sys. Tech. J., Vol. 40, 453–488 (1961).

H. Kogelnik and T. Li, Laser beams and resonators, Proc. IEEE, Vol 54, No 10, 1312–1328 (1966).

The field distribution is expressed as follows:

$$F^{NM}(r,\Theta)=R^{NM}(r)*\mathrm{Exp}(iN\Theta) \qquad [1]$$

where r is the radial coordinate, $\Theta$ is the angular coordinate, N is the angular factor describing the angular distribution of the mode, M is the radial factor describing the radial distribution of the mode and R could be an arbitrary complete set of orthogonal functions.

There are known several techniques to 1) change the field distribution of the modes, 2) achieve mode discrimination and 3) increase the output power. These techniques are briefly described hereinbelow:

1) Mode shaping: The field distribution of the modes is mainly determined by the reflectors and the lenses that are incorporated into the optical resonator. Typically, the shape of these elements is spherical, and the field distribution of the resulting modes is well known as described, in H. Kogelnik and T. Li, Laser beams and resonators, Proc. IEEE, Vol 54, No 10, 1312–1328 (1966).

Recently, new types of reflectors have been introduced in order to control the field distribution of the modes. These reflectors are independent of angular coordinates but dependent on radial coordinate. Consequently, they can control only the radial field distribution of the modes. Reflectors of this type are described in P. A. Belanger, P. L. Lachance and C. Pare, Super-Gaussian output from a $CO_2$ laser by using a graded phase mirror resonator, Opt. Let, Vol. 17, No. 10, 739–741 (1992).

2) Mode discrimination: The number of modes in an optical resonator can be reduced, even to a single mode, by introducing an aperture inside the resonator. A parameter that describes the relative aperture width is called the Fresnel number. The Fresnel number is defined by the following expression:

$$F = \frac{a^2}{\lambda * L} \qquad [2]$$

where a is the radius of the aperture, L is the length of the optical resonator and $\lambda$ is the wavelength of the mode.

When the Fresnel number is small, corresponding to a small aperture, only the mode with the narrowest field distribution propagates while the rest of the modes suffer a large increase in loss of intensity and cease to exist. In such a situation, single mode operation can be easily achieved, thereby discriminating it from the other modes. The quality of the resulting output beam is high, with corresponding relatively low $M^2$. Unfortunately, such a configuration, having a small internal aperture, is not suitable for many laser resonators, as explained hereinbelow.

3) Increasing output power: The gain medium inside the laser resonator must be illuminated by the field distribution of the mode in an optimal way in order to achieve maximal output power. For example, an annular shape of illumination is best for a DC discharge $CO_2$ laser where a high temperature along the longitudinal axis of the laser reduces power of the center of the output beam. The conventional way to obtain such a field illumination shape is to use optical resonators with large Fresnel numbers, corresponding to wide apertures.

As a result of using wide apertures, many modes exist simultaneously, so that a large portion of the gain medium is illuminated. This method for increasing the output power results in a reduction of the beam quality. This is because an output beam having modes with a wide field distribution diverges strongly as it emerges from the laser. Due to the fact that more than one mode exists simultaneously, the use of a compensating optical element to improve the output beam quality is not possible.

Techniques have been proposed to change the angular distribution of the output beam after it emerges from the laser, in order to reduce divergence. Reference is made to L. W. Casperson, N. K. Kincheloe and O. M. Stafsudd, Phase plates for laser beam compensation, Opt. Comm., Vol. 21, No. 1, 1–4 (1977). Unfortunately, these techniques for changing the angular distribution do not reduce the divergence as defined by the $M^2$ parameter. Reference is made to A. E. Siegman, Binary phase plates cannot improve laser beam quality, Opt. Lett., Vol. 18, No., 675–677 (1993).

In summary, it is appreciated that in conventional optical laser resonators a compromise must be made between increased output power and output beam quality. Expressed in more technical terms, this means that the need for wide optical resonators with large Fresnel numbers is contradicted by the need for output beam with low divergence, i.e. low $M^2$.

SUMMARY OF THE INVENTION

The present invention seeks to provide an improved optical resonator.

There is thus provided in accordance with a preferred embodiment of the present invention an optical resonator comprising at least one spiral optical element operative to change the angular phase distribution of modes in the optical resonator, thereby to generally eliminate undesirable modes.

Preferably, there are provided a pair of spiral optical elements providing opposite angular phase changes to the modes.

There may also be provided at least one element, which is not a spiral optical element, that reverses the angular phase of an incident mode. Such an element may be, for example, a phase conjugate mirror, a hollow roof prism, a Poro prism, a cylindrical reflector and a cylindrical lens.

The optical resonator may be embodied in a laser, such as an axial laser or ring laser. The laser may be stable or unstable. Alternatively, the optical resonator may be a passive optical resonator.

The spiral optical element may be embodied in at least one reflector or an output coupler, or alternatively may be positioned adjacent at least one reflector or an output coupler.

The spiral optical element may provide angular phase change as well as at least one of linear and radial phase change.

The optical resonator may also comprise an external spiral optical element operative to cancel distortions and to eliminate angular phase variations in an output beam from the optical resonator.

The basic principle of the invention is based on changing the angular distribution of undesirable modes so that their losses will be sufficient to prevent their existence. This is done by changing the angular factor, N in equation [1], using specially designed spiral optical elements.

In general, the field distribution of the modes is described by cylindrical representation set forth in equation [1], where the angular factor for each mode distribution is different. Moreover, in all known optical resonators, including active resonators such as lasers and passive resonators, such as Fabry Perot resonators, this angular factor does not change as a mode propagates inside the resonator.

In the present invention, the angular distribution for the field of a mode is changed by employing either, in general cases, at least two angularly phase varying spiral optical elements inside the resonator or in special cases, at least one spiral optical element and at least one element that reverses the angular phase of an incident mode, such as a phase conjugate mirror.

Thus, in accordance with a preferred embodiment of the present invention, single mode operation and high beam quality are achieved even in a resonator with a large Fresnel number.

The two spiral optical elements are preferably designed in such a way that one spiral optical element increases the angular factor by introducing a phase of $-2N\Theta$ to an incoming wave, while the other spiral optical element introduces $+2N\Theta$. The two phases introduced by the spiral optical elements cancel each other, so that after one round-trip of the mode inside the optical resonator the angular distribution returns to itself.

In order to explain the physical meaning of the change introduced by the two spiral optical elements, the angular factor associated with a certain mode at an arbitrary point in the optical resonator is defined as K. As the mode propagates inside the resonator, the radial distribution for the field of the mode is inherently altered to fit this angular factor.

One spiral optical element changes the angular factor from K to K−2N, where −2N is the angular phase factor of the spiral optical element. The new angular factor, K−2N, no longer fits the radial distribution. As a result, the field distribution of the mode widens, thereby increasing the loss of its intensity. In essence, the intensity of the mode decays until it does no longer exist.

The same process is repeated at the other spiral optical element but with an opposite sign for the 2N. This process is employed for all modes except for the one with an angular factor K=N. This particular mode suffers no increase in loss because its angular factor changes from N to −N and back. The radial intensity distributions for both angular factors N and −N are identical, so that the radial distribution always fits the angular factor.

The provision of two spiral optical elements inside an optical resonator results in a predetermined single mode operation of the optical resonator. This mode need not have the narrowest field distribution as required in conventional optical resonators, but simply depends on the angular phases of the spiral optical elements.

Moreover, it is possible to distinguish between modes associated with angular factors of opposite signs.

Once single mode operation is established and the mode has a well known angular factor, it is relatively easy to eliminate the angular dependence of the beam emerging from the optical resonator. This can be done, for example, using a third spiral optical element having an angular phase $-N\Theta$, placed just outside the resonator. The elimination of angular dependence reduces the divergence of the output beam and thereby reduces the $M^2$ parameter.

In some cases an external optical amplifier can be added in order to increase the power of the laser light. In these cases, the third spiral element may be placed after the amplifier rather than adjacent to the laser resonator. Thus, the distribution of light entering the amplifier will still be broad, so more efficient amplification can be achieved.

In special cases, such as high power lasers, it is possible to employ a single spiral optical element. Instead of a second spiral optical element, an element that merely changes the sign of the angular factor of any incident mode is employed. Examples of such an element are a phase conjugate mirror, a V-shaped reflector and a prism.

The design of the spiral optical elements can vary from one resonator to the other, but there is inherently one feature in common for all spiral optical elements, that changes the angular factor of a mode inside an optical resonator. The phases of these spiral optical elements all have at least one point of singularity. This means that, for a closed trajectory at the plane of the spiral optical element and around a singularity point, the phase of the spiral optical element has at least one discontinuity point of magnitude of $2N\pi$, with N being an integer. The sum of all discontinuities, positive and negative, in the closed trajectory determines the angular phase change introduced by the spiral optical element.

Several angular phase elements, each from a different spiral optical element, can be incorporated into one element. Such a combined element can have either a multiplicity of singular points or different magnitudes of phase discontinuities around the singularity point, or both.

In order to analyze the properties of the optical resonator, the present inventors have developed a new mathematical algorithm, where the optical resonator is presented as an operator. The eigen vectors of this operator denote the modes and the eigen values their losses.

BRIEF DESCRIPTION OF THE DRAWINGS

The present invention will be understood and appreciated more fully from the following detailed description, taken in conjunction with the drawings in which:

FIG. 15 is a simplified illustration of a cylindrical tube of a DC discharge $CO_2$ laser which contains a mixture of gases;

FIG. 16 is a simplified illustration of an annular tube of a RF exited $CO_2$ laser wherein the external envelope and the internal section of the tube are being cooled by external means;

FIG. 17 is a simplified illustration of a cylindrical tube of a Nd:YAG laser wherein the gain medium is pumped by diode lasers located along the circumference of the tube;

DETAILED DESCRIPTION OF PREFERRED EMBODIMENTS

Figure 1:
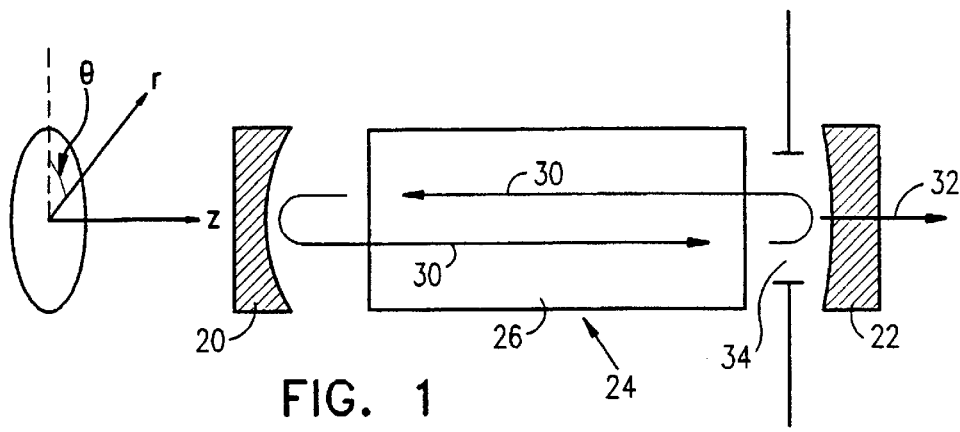
FIG. 1 is a schematic illustration of an axial laser constructed and operative in accordance with a preferred embodiment of the present invention.

Reference is now made to FIG. 1, which is a schematic illustration of an axial laser constructed and operative in accordance with a preferred embodiment of the present invention. The axial laser comprises a reflector 20 and an output coupler 22 disposed at opposite ends of an optical resonator 24 which contains a gain medium 26.

A mode, indicated by reference numeral 30 is seen to propagate back and forth between the reflector 20 and the output coupler 22, while passing through the gain medium 26. A beam of light 32 is emitted through the output coupler 22. The width of mode 30 inside the laser is influenced by an aperture 34.

The cylindrical coordinates of the laser are indicated in FIG. 1, z being the longitudinal axis, r being the radial distance and Θ is the angle. The angular phase dependence of a desired mode in the laser is chosen, according to the present invention, to be Exp(iNΘ) when propagating to the right and Exp(−iNΘ) when propagating to the left, in the sense of FIG. 1.

Alternatively, the angular phase dependence can be chosen to be Exp(−iNΘ) when the mode propagates to the right in the sense of FIG. 1 and Exp(iNΘ) when the mode propagates to the left in the sense of FIG. 1.

In accordance with a preferred embodiment of the invention, the laser of FIG. 1 is characterized in that it includes at least one spiral optical element operative to change the radial distribution of undesirable modes in the optical resonator, so that the radial distribution of the undesirable modes will be broader then the radial distribution of the desired mode, thereby to generally eliminate the existence of the undesirable modes.

Preferably, two spiral optical elements are employed. Alternatively there may be provided one spiral optical element and one element that reverses the angular phase of an incident mode, such as a phase conjugate mirror.

Three alternative embodiments of a reflector arrangement including a spiral optical element will now be described with reference to FIGS. 2, 3 and 4.

Figure 2:
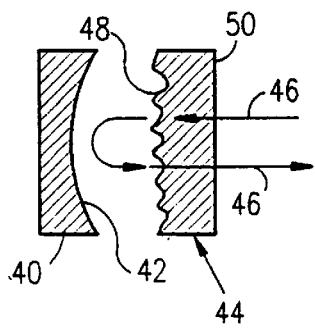
FIG. 2 is a schematic illustration of a reflector arrangement useful in the laser of FIG. 1 and including a combination of a conventional reflector and an angularly dependent spiral optical element, wherein an incident mode passes through the spiral optical element before and after being reflected from the reflector.

FIG. 2 is a schematic illustration of a reflector arrangement useful in the laser of FIG. 1. The reflector arrangement of FIG. 2 includes a conventional reflector 40 having an angularly independent surface 42 which is preferably coated to achieve maximum reflectivity. An angularly dependent spiral optical element 44 is placed close to the conventional reflector 40 such that an incident mode, indicated by reference numeral 46, passes through the spiral optical element 44 before and after being reflected by the conventional reflector 40.

Preferably, a spiral surface 48 of the spiral optical element 44 is so shaped that a mode transmitted therethrough undergoes a phase change of +NΘ, where N is the angular factor of the desired mode inside the laser. An opposite surface 50 of the spiral optical element 44 may be planar.

The spiral surface 48 of the spiral optical element 44 can be formed in various ways, such as, for example, with the aid of computer generated masks and photolithographic methods or by diamond turning.

Some preferred configurations for the spiral surface 48 of the spiral optical element 44 are presented in FIGS. 8–11. These surfaces can be created, for example, by the use of a series of masks such as those illustrated in FIGS. 14A, 14B, 14C, 14D and 14E. These masks may be employed in photolithographic methods wherein a required shape is approximated as multiplicity of levels. Such a construction is described in the following reference: E. Hasman, N. Davidson and A. A. Friesem, Efficient multilevel phase holograms for $CO_2$ lasers, Opt. Lett. 16, 423 (1991). Preferably, the surfaces of the spiral optical element 44 are coated with antireflection layers.

In the embodiment of FIG. 2, the phase change applied to mode 46 is a combination of a radial phase change introduced by surface 42 of conventional reflector 40 and angular phase change introduced by two passes of the mode through surface 48 of spiral optical element 44. A total angular phase change of +2NΘ is produced.

Figure 3:
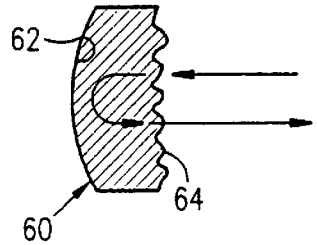
FIG. 3 is a schematic illustration of a reflector arrangement useful in the laser of FIG. 1 and including a hybrid reflective/spiral element having a reflective surface which is angularly independent and a spiral surface which introduces an angular phase change.

Reference is now made to FIG. 3, which is a schematic illustration of a reflector arrangement useful in the laser of FIG. 1 and including a hybrid reflective/spiral element 60 having a reflective surface 62 which is angularly independent and a spiral surface 64 which introduces an angular phase change.

In the embodiment of FIG. 3, surfaces equivalent to surfaces 42 and 48 (FIG. 2) are incorporated into single hybrid element 60, having reflective surface 62 and spiral surface 64. The advantage of this configuration is that less surfaces and less elements are needed.

Figure 4:
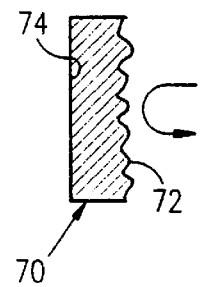
FIG. 4 is a schematic illustration of a reflector arrangement useful in the laser of FIG. 1 and including a diffracting mirror where radial phase and angular phase are derived from a single spiral optical surface.

Reference is now made to FIG. 4, which is a schematic illustration of a reflector arrangement useful in the laser of FIG. 1 and including a diffracting mirror 70 where radial phase and angular phase are derived from a single spiral optical element embodied therein.

The embodiment of FIG. 4 combines the radial phase of surface 62 and the angular phase of surface 64 of the embodiment of FIG. 3. This is achieved using diffracting mirror 70 which constitutes a single spiral optical element having a spiral surface 72 to achieve the desired phase change. An opposite facing surface 74 of mirror 70 may be arbitrarily shaped and is typically planar for simplicity. Surface 72 is preferably coated with reflecting material.

The angular phase change, +2NΘ, produced by diffracting mirror 70 is preferably twice that produced by element 44 (FIG. 2) because the mode is reflected only once in every round-trip.

Figure 5:
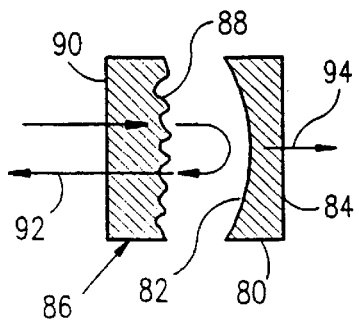
FIG. 5 is a schematic illustration of an output coupler arrangement useful in the laser of FIG. 1 and including a combination of a conventional output coupler, with angularly independent surfaces and an angularly dependent spiral optical element.
Figure 6:
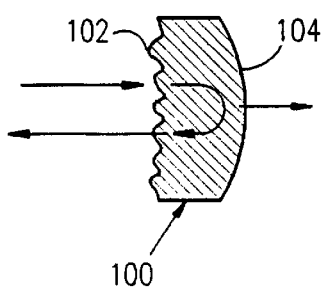
FIG. 6 is a schematic illustration of an output coupler arrangement useful in the laser of FIG. 1 and including a hybrid element which constitutes an output coupler and combines a spiral surface, which introduces an angular phase change, and a reflective surface which is angularly independent.
Figure 7:
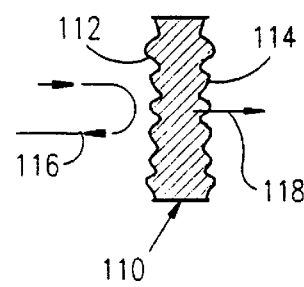
FIG. 7 is a schematic illustration of an output coupler arrangement useful in the laser of FIG. 1 and including a diffracting output coupler wherein radial phase and angular phase are derived from a single spiral optical element surface which is also partially reflecting and wherein the external surface of the output coupler is also a spiral optical element that introduces compensation to the emitted beam.

Reference is now made to FIGS. 5, 6 and 7 which illustrate three exemplary configurations of an output coupler constructed and operative in accordance with a preferred embodiment of the present invention.

FIG. 5 is a schematic illustration of an output coupler arrangement useful in the laser of FIG. 1 and including a combination of a conventional output coupler 80, with angularly symmetric surfaces 82 and 84 and an angularly dependent spiral optical element 86.

In the embodiment of FIG. 5, the spiral optical element 86 may be identical to spiral optical element 44 (FIG. 2), except that it is so formed as to introduce a phase change of opposite sign thereto, i.e. −2NΘ. Spiral optical element 86 preferably includes a spiral surface 88 and a planar surface 90, both of which are coated with antireflection layers.

The conventional output coupler 80 is preferably coated with a partial reflecting coating on surface 82 and an antireflection coating on surface 84. An incident mode 92 passes through the spiral optical element 86 both before and after being reflected by the output coupler 80. Part of the energy of the mode 92 is coupled outwardly as a beam 94. This part of the energy passes through the spiral optical element 86 only once and thus it has no angular dependence.

Reference is now made to FIG. 6, which is a schematic illustration of an output coupler arrangement useful in the laser of FIG. 1 and including a hybrid element 100 which constitutes an output coupler and combines a spiral surface 102, which introduces an angular phase change, and a reflective surface 104 which is angularly independent.

The embodiment of FIG. 6 combines elements 80 and 86 of the embodiment of FIG. 5 to achieve a single hybrid element 100 having less surfaces. Spiral surface 102 may be the same as surface 88 in the embodiment of FIG. 5, while reflective surface 104 may be the same as surface 82 in the embodiment of FIG. 5.

In the embodiments of FIGS. 5 and 6, the emitted output beam has no angular dependence because this beam passes only once through the spiral optical element. This angular independence results in decreased divergence of the output beam and consequent reduction in the $M^2$ parameter of the beam.

Reference is now made to FIG. 7, which is a schematic illustration of an output coupler 110 useful in the laser of FIG. 1. In the embodiment of FIG. 7, the output coupler 110 has two spiral surfaces 112 and 114. Surface 112 is coated to achieve partial reflection. This surface is designed to introduce radial as well as angular phase change to the reflected mode, which is designated by reference numeral 116. The angular phase change is $-2N\Theta$.

It is well known that the profile height required for a reflecting spiral optical element in order to achieve $2\pi$ phase change is $d_{reflection}=\lambda/2$ whereas the profile height for a transmissive spiral element in order to achieve $2\pi$ phase change is $d_{transmission}=\lambda/(n-1)$ with n being the refractive index of the transmissive element.

Since the transmitted beam 118 is affected by a profile height $d^{reflection}$ of surface 112 which differs from that for a transmission surface, the beam is distorted. To compensate for this distortion, the second spiral surface 114 is introduced. The shape of this surface is the same as that of surface 112 except that its profile height is given by:

$d_{compensat}=d_{transmission}-d_{reflection}$.

After passing through surface 112, the transmitted beam has a certain known angular phase dependence. To obtain a uniform beam, with no angular phase variation, it is necessary either to add another element whose surface eliminates the angular phase variations or to change surface 114 to further compensate for the angular phase variation.

The advantage of the embodiment of FIG. 7 is that the modes 116 inside the resonator do not pass through the substrate of the output coupler 110, but are reflected directly from surface 112. As a result, losses to absorption are reduced.

It is appreciated that in accordance with a preferred embodiment of the invention, the most important components of the laser is the at least one element on either side of the resonator, which introduces an angular phase change of $+2N\Theta$ and the other of $-2N\Theta$.

Some representative shapes for spiral optical elements that produce only an angular phase change are shown in FIGS. 8–11. These shapes have the form of a spiral, the approximation to a spiral, or some portion or portions of a spiral, where there is a continuous circular increase of height from some starting line. These elements are here termed spiral optical elements.

Figure 8:
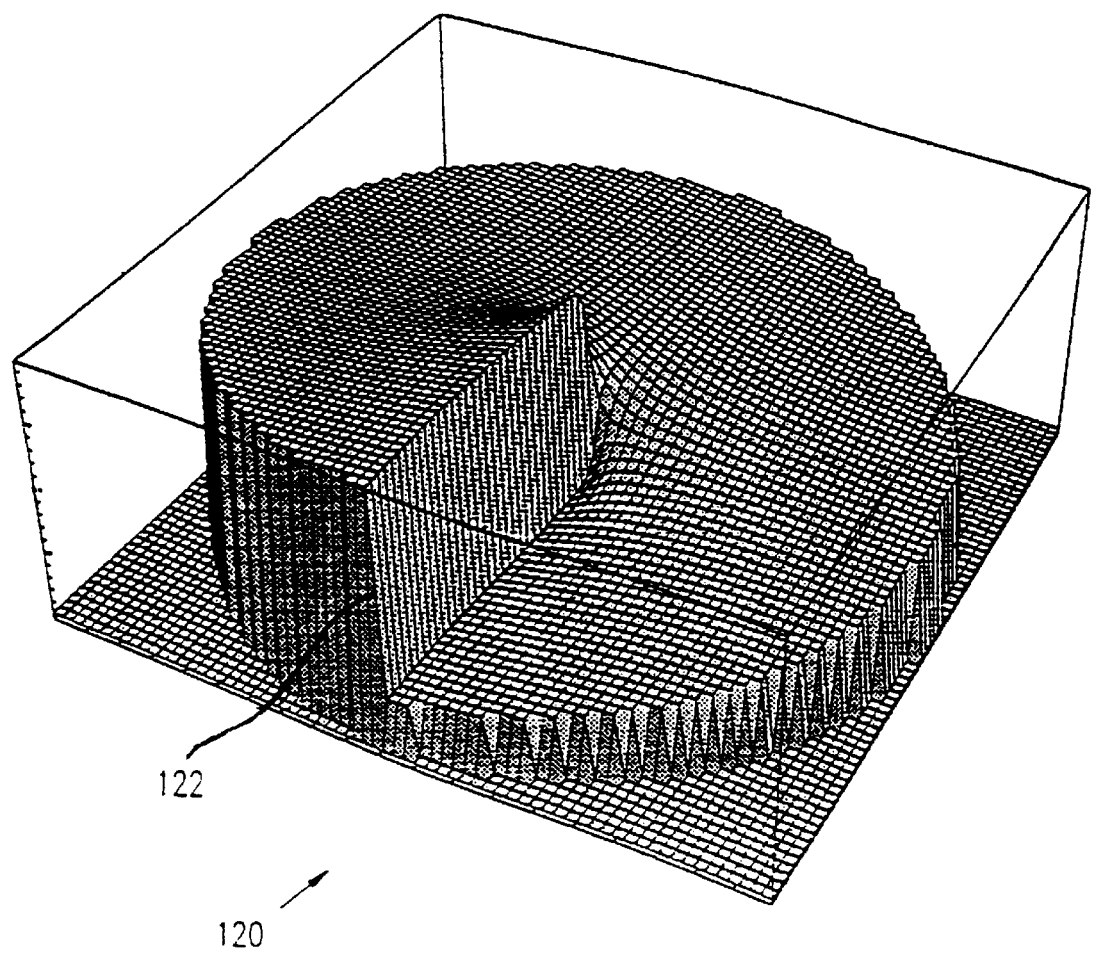
FIG. 8 is a schematic illustration of a spiral optical element having a single discontinuity and a positive angular phase.

FIG. 8 shows a spiral optical element 120 that provides an angular factor N=1 when the height of discontinuity 122 is $2\pi$. Also, it can yield increasingly higher N (integers) by a corresponding increase of the height of discontinuity 122 by multiples of $2\pi$, i.e. $2M\pi$, where in this case M, an integer, is M=N.

Figure 9:
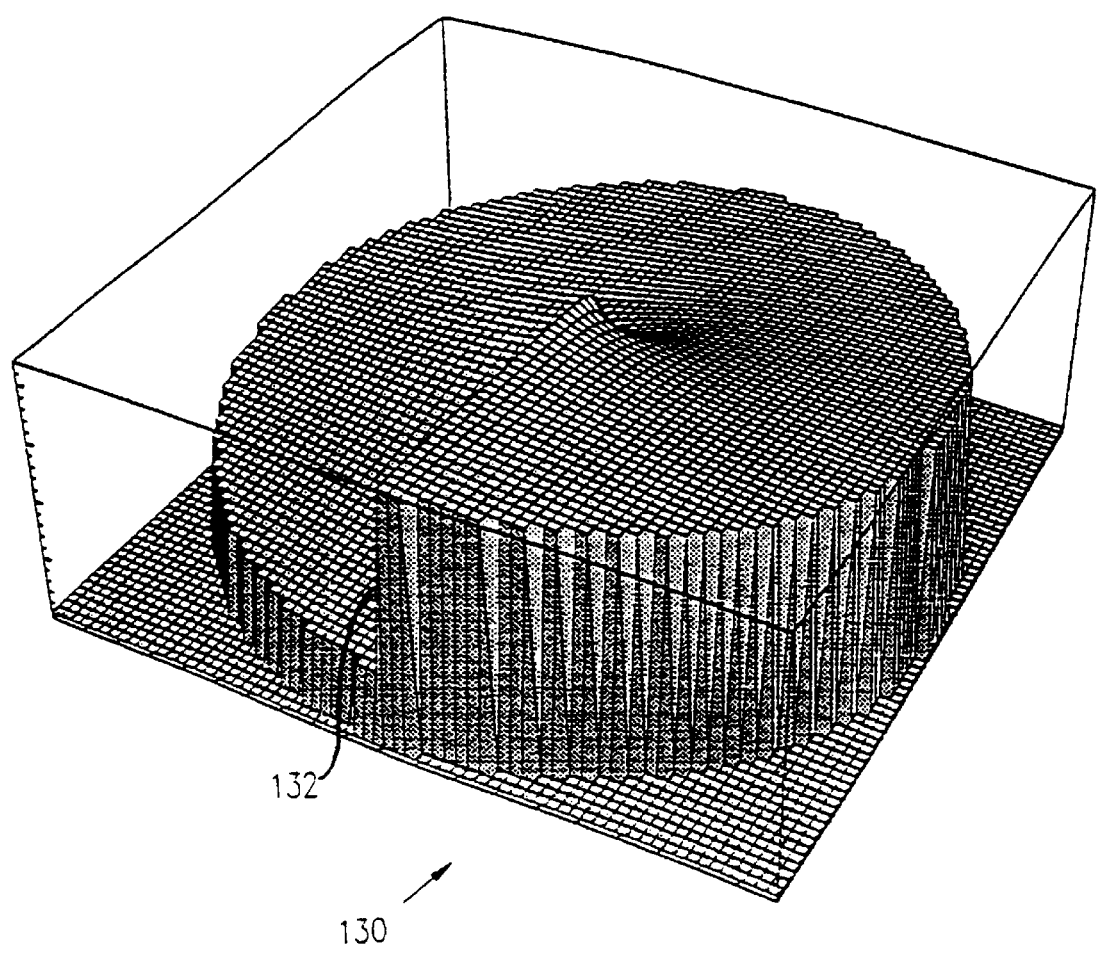
FIG. 9 is a schematic illustration of a spiral optical element having a single discontinuity and a negative angular phase.
Figure 10:
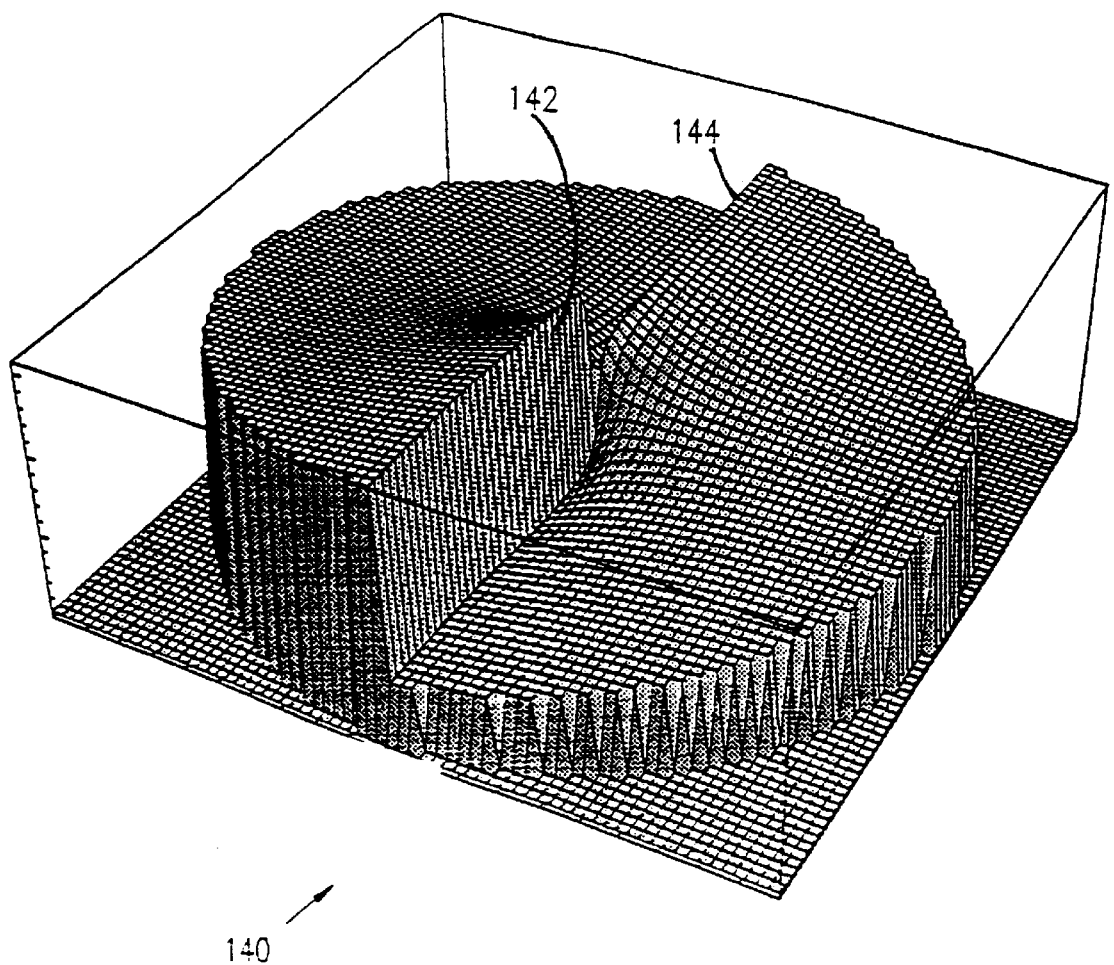
FIG. 10 is a schematic illustration of a spiral optical element having two uneven discontinuities and a positive angular phase.

FIG. 9 shows a spiral optical element 130 that provides N=-1 or higher negative angular factors by increasing the height of discontinuity, as above. FIG. 10 shows a spiral optical element 140 which has two discontinuities, indicated by reference numbers 142 and 144. The height of each discontinuity must be an integer multiple of $2\pi$, and the height of one need not be equal to the height of the other, as shown in FIG. 10. The minimum angular factor N of the spiral optical element 140 is 2, but this factor can be increased by increasing the height of one or both discontinuities by multiples of $2\pi$.

Figure 11:
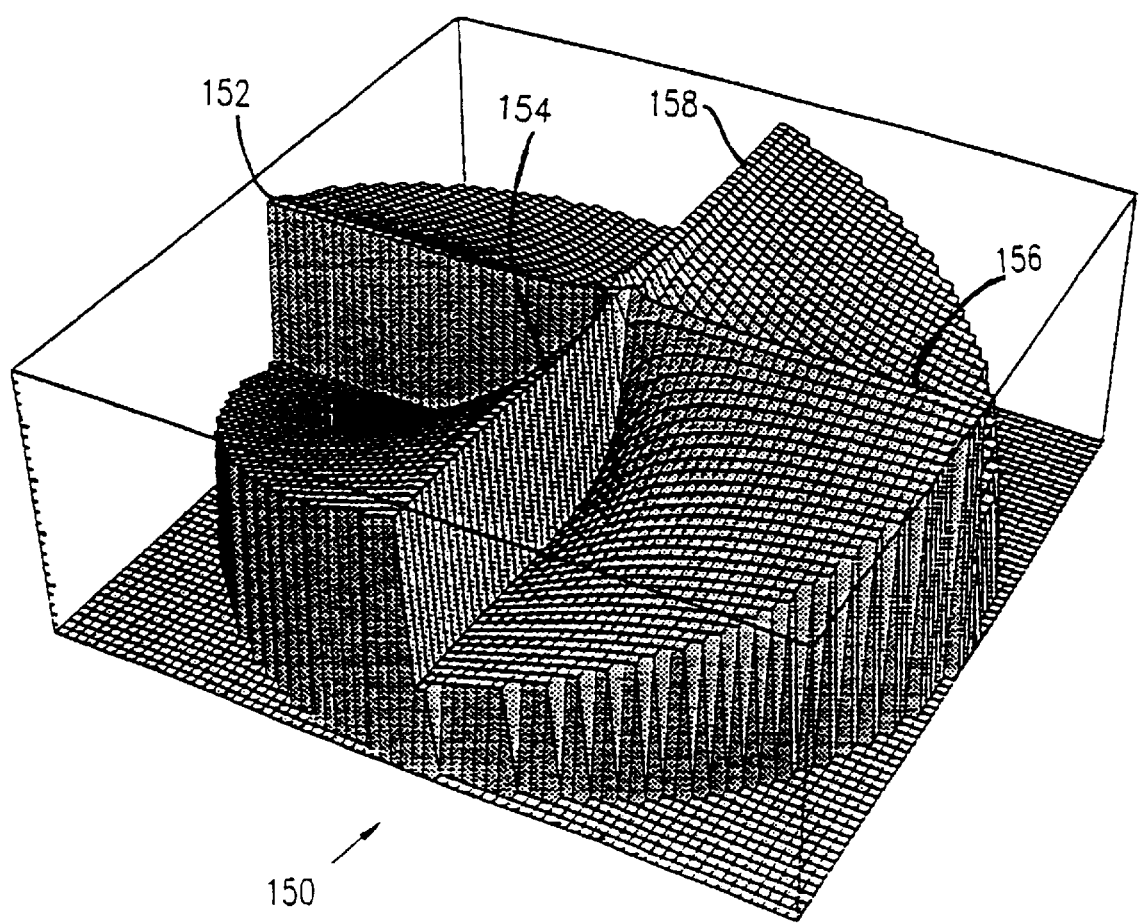
FIG. 11 is a schematic illustration of a spiral optical element having four discontinuities and a positive angular phase.

FIG. 11 shows a spiral optical element 150 having four discontinuities 152, 154, 156 and 158. Here also, the height of each discontinuity must be an integer multiple of $2\pi$. The minimum angular phase change introduced by such an element is limited by the number of discontinuities. For example, since the spiral optical element 150 shown in FIG. 11 has four discontinuities, the minimum angular phase change is $4\Theta$, corresponding to an angular factor N of 4.

Some lasers have a configuration in which the cross-sectional shape of the gain medium is non-circular. In order to achieve a good overlap between the light distribution inside the laser and such a non-circular gain medium, it is possible to exploit a spiral optical element having several singularity points.

Figure 12:
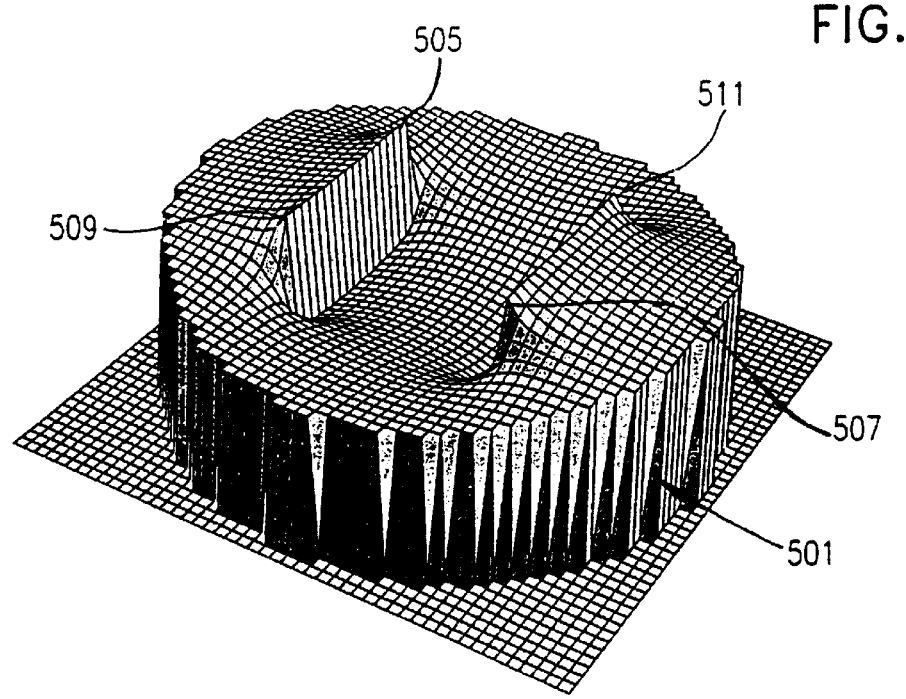
FIG. 12 is a schematic illustration of a spiral element having four singularity points.

An example of such an optical element is illustrated in FIG. 12, where the element is denoted as 501. This element provides an angular phase change which results from a combination of four different singularity points. The singularity points 505 and 507 provide an angular phase change of $\text{Exp}(i\Theta)$ and the singularity points 509 and 511 provide an angular phase change of $\text{Exp}(i\Theta)$. As a result of element 501, the light distribution inside the resonator approximates a rectangular shape.

In general, any arbitrary light distribution inside the resonator can be approximated by restoring spiral optical elements having a multiplicity of singularity points that are distributed at prescribed locations. Such unusual distributions are suitable, for example in diode lasers and slab lasers.

Figure 13:
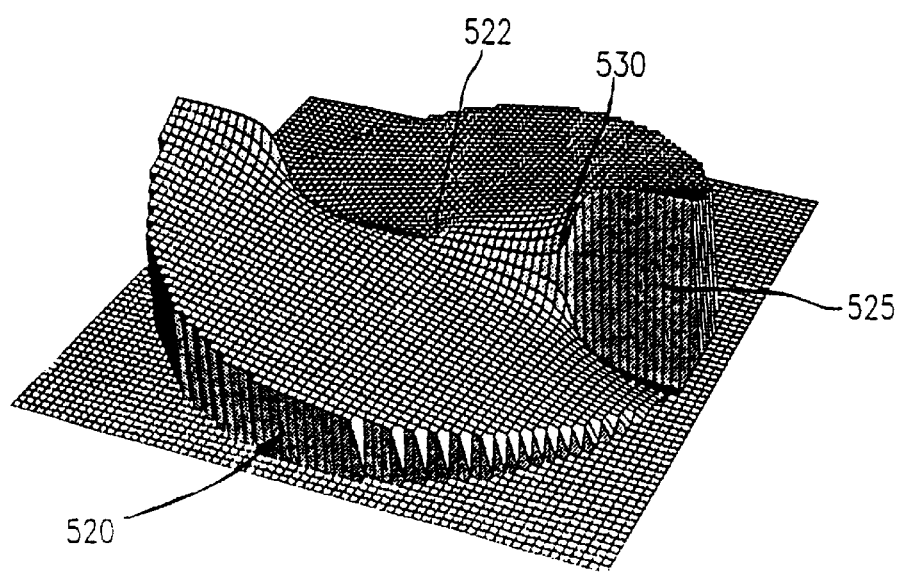
FIG. 13 is a schematic illustration of a spiral element having no phase discontinuity near the center and significant phase discontinuities away from the center.
Figure 14A:
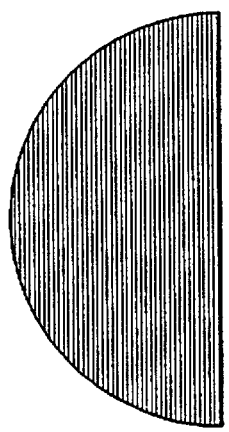
FIGS. 14A, 14B, 14C, 14D and 14E are illustrations of five masks which may be used to realize the angular phase change $Exp(\pm N\Theta)$ in a spiral optical element using photo-lithographic methods wherein a required shape is approximated as multiplicity of levels.
Figure 14B:
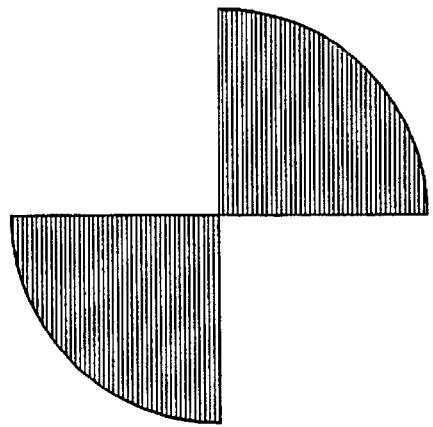
Figure 14C:
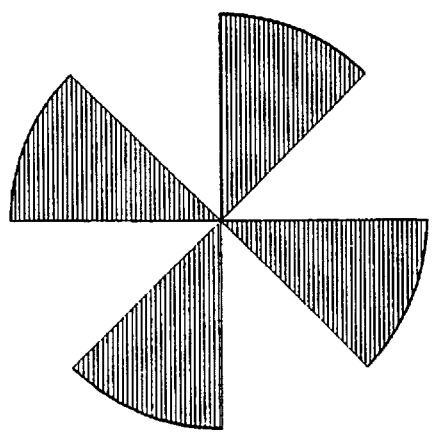
Figure 14D:
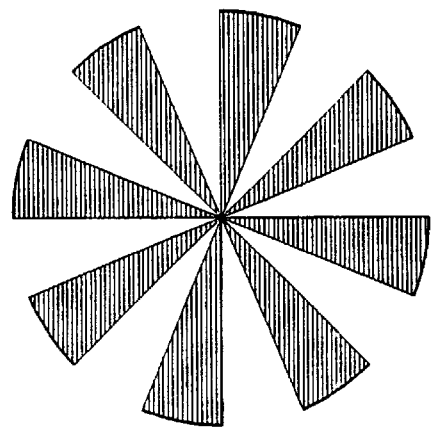
Figure 14E:
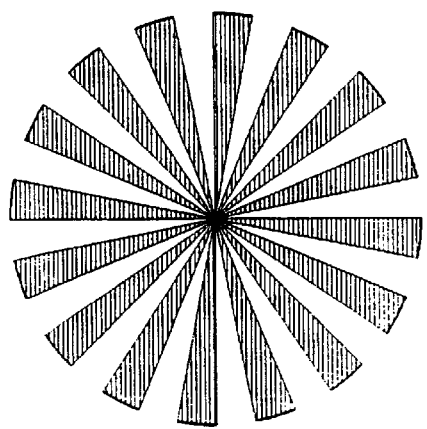
Figure 18A:
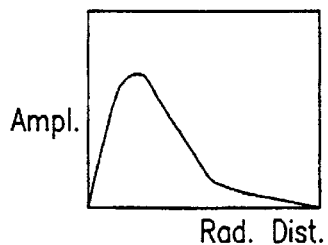
FIGS. 18A, 18B, 18C, 18D, 18E, 18F, 18G, 18H and 18I are illustrations of a radial distribution of a mode with angular factor N=1, wherein the individual curves describe the amplitude of a mode at successive distances along the longitudinal axis of the laser, starting with curve A close to the output coupler and ending with curve I close to the reflector.
Figure 18B:
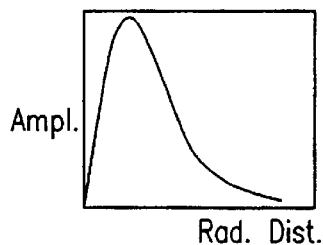
Figure 18C:
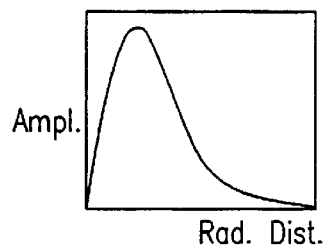
Figure 18D:
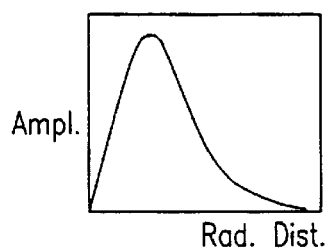
Figure 18E:
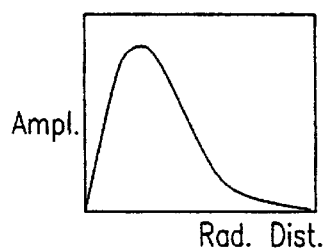
Figure 18F:
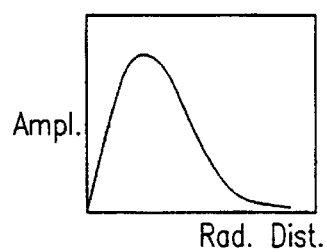
Figure 18G:
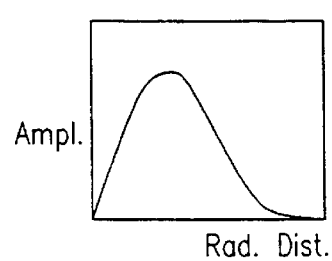
Figure 18H:
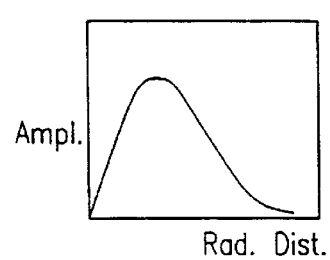
Figure 18I:
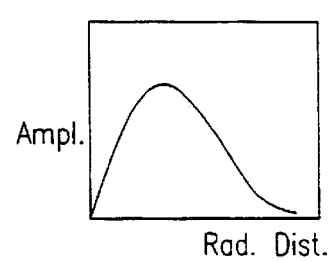
Figure 19A:
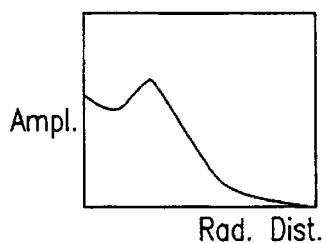
FIGS. 19A, 19B, 19C, 19D, 19E, 19F, 19G, 19H and 19I are illustrations of a radial amplitude distribution of the output beam corresponding to the radial distribution shown in FIGS. 18A–18I and wherein individual curves describe the amplitudes as a function of radial distance for different locations along the output axis, with curve A being closest to the output coupler.
Figure 19B:
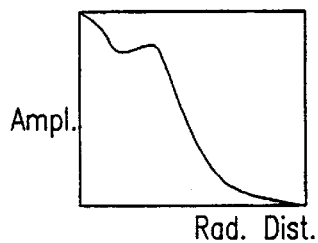
Figure 19C:
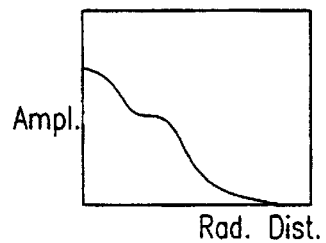
Figure 19D:
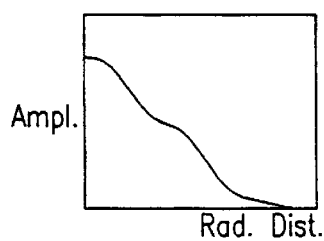
Figure 19E:
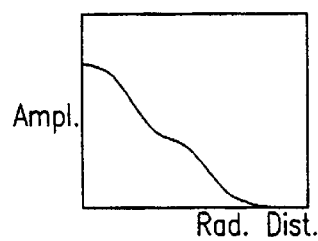
Figure 19F:
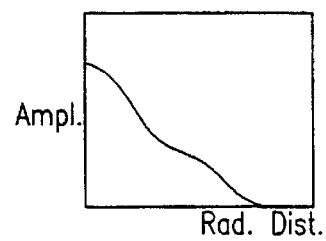
Figure 19G:
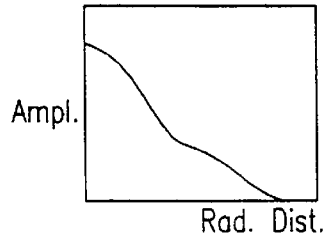
Figure 19H:
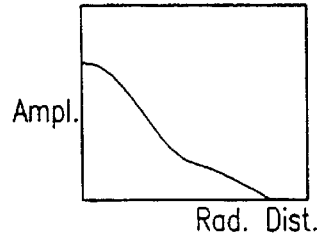
Figure 19I:
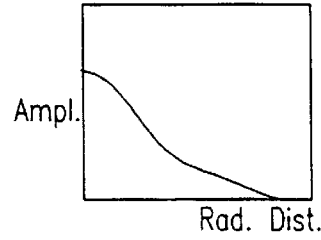

Another method for matching the light distribution inside the resonator to the shape of the gain medium involves a combined spiral optical element where several angular phase changes, each from a different spiral optical element, are incorporated. FIG. 13 shows an embodiment of such a combined spiral optical element 520. This element 520 provides an angular phase change which results from combining the contributions of two angular phases from two different elements. The central section of the element 522 is designed to yield a Gaussian light distribution [mode (0,0)]; therefore, a closed trajectory around the center of the element encounters no discontinuity in the phase of the element. The outer section (toward to the outer circumference) of the element 525 is designed to yield a ring-like distribution [mode (0,2)]; therefore, a closed trajectory at this outer section of the element encounters two sharp phase discontinuities. In the middle of the element 530 mode (0,0) and mode (0,2) overlap, so the phase discontinuity must be gradual.

In order to design a combined spiral optical element, we could first calculate the light distribution of each mode separately. Then, we coherently combine these distributions to obtain the overall combined light distribution inside the resonator. Finally, the spiral optical element is so designed to yield a light distribution whose angular phase match the phase of the calculated combined distribution.

The spiral optical element of the present invention can, in principle, be realized as one or more reflective, refractive and diffractive elements. It may be produced by mechanical methods such as diamond-turning, photolithographic methods and chemical methods, such as doping. The use of photolithographic methods involves the use of computer generated masks. Examples of five masks that can be used to form a spiral optical element, are presented in FIGS. 14A–14E.

The singularity point of the phase of the spiral optical element can be observed at the center of each of the masks. By using these masks successively with a mask aligner, it is possible to form a multi-level relief pattern which will approximate the continuous shape needed for a spiral optical element. For example, by using the masks of FIGS. 14A, 14B, 14C and 14D, it is possible to approximate the shape of the spiral optical element shown in FIG. 8, and by using the masks of FIGS. 14B, 14C, 14D and 14E, it is possible to approximate the shape of a spiral optical element with two equal discontinuities.

The shape of the gain medium is preferably designed according to limitations imposed by the physical properties of the gain material. The distribution of the modes inside a conventional laser does not always fit such shapes. By using the present invention, the distribution of the modes can be adjusted to fit the shape of the gain medium in order to achieve more output power.

Three typical shapes of gain media 26 (FIG. 1) are presented in FIGS. 15, 16 and 17. The spiral optical elements described hereinabove can be associated with any of these shapes.

FIG. 15 is a simplified illustration of a DC discharge $CO_2$ laser constructed and operative in accordance with a preferred embodiment of the present invention. As in many relatively low power $CO_2$ lasers, a cylinder 170, arranged to be cooled externally, contains a mixture of gases. First and second electrodes 172 and 174, disposed at opposite ends of the cylinder 170 are operative to cause discharge of the gases. This discharge pumps the $CO_2$ molecules to their excited state and heats them.

The efficiency of the pumping process is sensitive to temperature. Near the cooled cylinder 170, where the temperature is relatively low, the pumping process is efficient. However, along the axis of the cylinder the temperature is higher and therefore the pumping is less efficient and the resulting gain in radiation energy is low. Thus, in conventional laser design, the maximum radius of the cylinder 170 must be limited, resulting in relatively low output power.

According to the present invention, this limitation can be overcome by employing an annular mode, produced using the spiral optical elements of the present invention. This annular mode is not be disturbed by the high temperature along the axis of cylinder 170.

Reference is now made to FIG. 16, which is a simplified illustration of an RF exited $CO_2$ laser 190 having an annular tube 192 and a cylindrical outer envelope 194, both of which are cooled by external means, such as a flowing coolant. This tube configuration is typically used in high power $CO_2$ lasers.

Gas inside the annular tube 192 is pumped by a RF field. The temperature of the gas is relatively low near the walls of the internal and external envelope of the annular tube, so more of the gas can be exploited. The modes that evolve in this resonator in a conventional configuration have a high angular factor and have almost the same losses, i.e. have small discrimination in losses. Therefore the output beam quality of this laser is relatively low.

Reference is now made to FIG. 17, which is a simplified illustration of a cylindrical tube 200 of a Nd:YAG laser wherein the gain medium 202 within tube 200 is pumped by diode lasers 204 located along the circumference of the tube.

Conventionally, the radius of the tube 200 is limited in accordance to the penetration depth of the pumping light from the diode lasers, in order to ensure uniform pumping of the gain medium. This limitation exists also for lamp pumped lasers.

According to present invention the size limitation and the need for uniform pumping are overcome by employing spiral optical elements 206 and 208 of the type described above with reference to FIGS. 2–7 of the present invention. Low pumping at the center of the gain medium 202 is compensated by the use of an annular mode formed by spiral optical elements.

The advantages of the present invention when applied to an axial laser, such as that of FIG. 1, are illustrated in the following simulations:

The simulations are for a DC discharge $CO_2$ laser with maximal aperture of 7 mm, radially flat output coupler, spherical reflecting mirror with radius curvature of 1.5M and a distance of 0.5M between the mirror and the output coupler. The spiral optical elements were designed to have an angular factor N=1. The results of the simulations are see in FIGS. 18A–18I and FIGS. 19A–19I.

FIGS. 18A, 18B, 18C, 18D, 18E, 18F, 18G, 18H and 18I are illustrations of a radial distribution of the amplitude of a mode with angular factor N=1, wherein the individual curves describe the amplitude of a mode at successive distances along the longitudinal axis of the laser, starting with curve A close to the output coupler and ending with curve I close to the reflector.

FIGS. 19A, 19B, 19C, 19D, 19E, 19F, 19G, 19H and 19I are illustrations of a radial amplitude distribution of the output beam corresponding to the radial distribution shown in FIGS. 18A–18I and wherein individual curves describe the amplitudes as a function of radial distance for different locations along the output axis, with curve A being closest to the output coupler.

FIGS. 18A–18I and FIGS. 19A–19I indicate that the mode maintains its annular shape inside the laser as a result of angular phase variations, whereas and that the emitted output beam changes radial shape because its angular phase variations have been eliminated. The elimination of angular variation improves output beam quality. For example, although the $M^2$ factor for the internal mode (FIGS. 18A–18I) is 2, the $M^2$ factor for the external beam (FIGS. 19A–19I) is only 1.3, as a result of eliminating the angular variation. Additional simulations show that modes with $M^2=9$ can be improved to obtain output beams with $M^2=2.4$.

Further improvement of beam quality can be achieved by utilizing external phase and amplitude transformation elements, as described, for example in N. Davidson, A. A. Friesem and E. Hasman, Optical coordinate transformations, Appl. Opt. 31, 1067 (1992).

Figure 20:
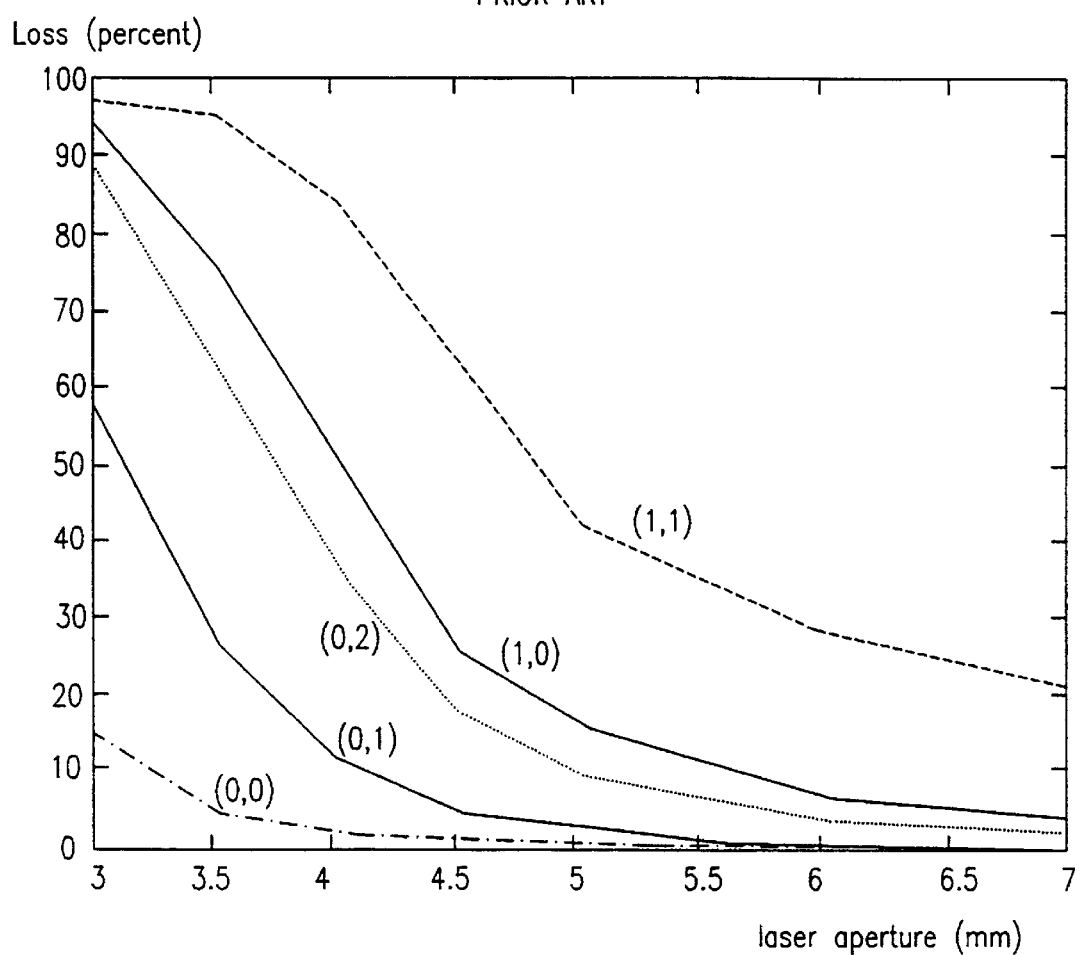
FIG. 20 is an illustration of losses for five different modes as a function of the aperture in a conventional axial laser without spiral optical elements, wherein modes with the lowest losses are depicted and the vertical axis represents the reduction in percentage of the intensity (loss) of the modes in every round-trip, and the horizontal axis represents the diameter of the laser aperture in mm.

The ability to discriminate between losses of modes is also improved significantly. FIG. 20 presents the modes with the lowest losses in a conventional axial laser. As shown, for aperture larger than 4.5 mm, there are more than one mode whose losses per round-trip are less than 5 percent. This means that a single mode operation can only be achieved by reducing the aperture, resulting in lower output power.

Figure 21:
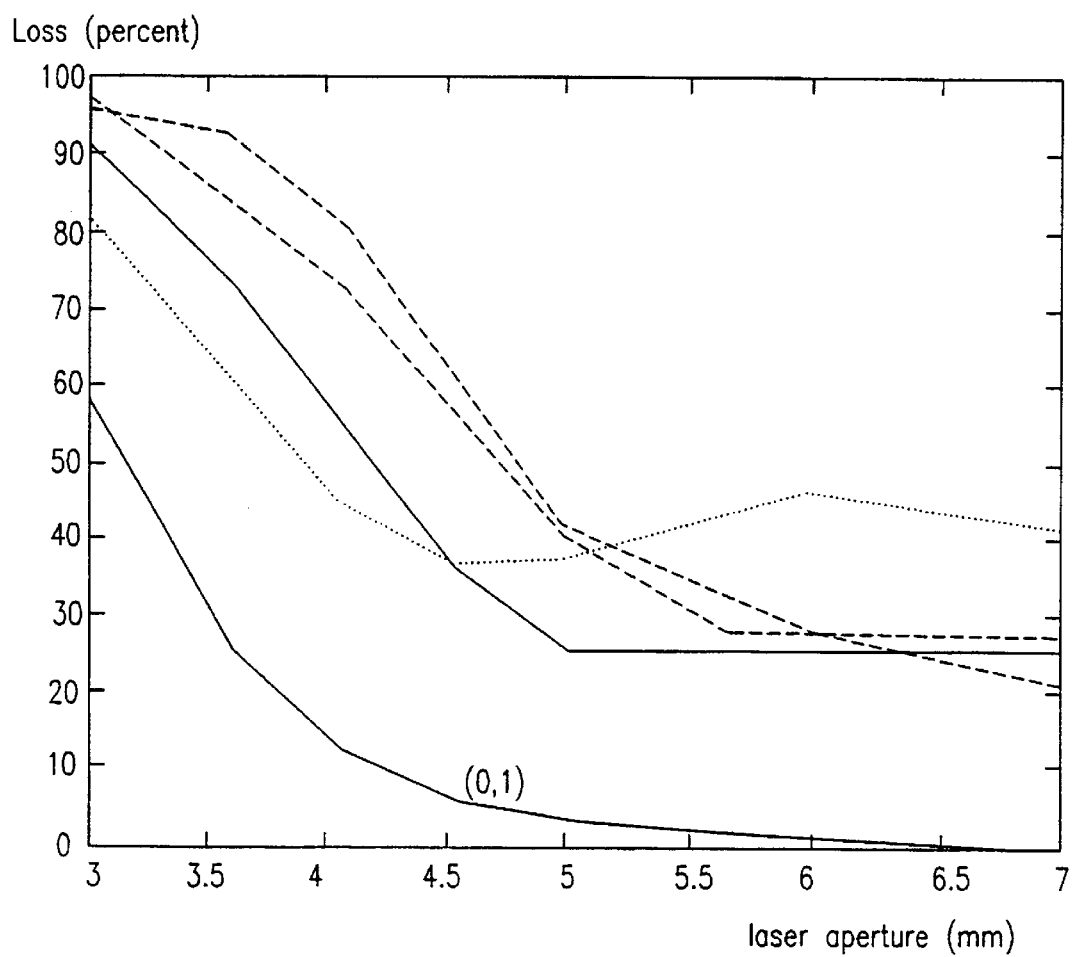
FIG. 21 is an illustration, on the same axes as FIG. 20, of losses for five different modes as a function of the aperture in a conventional axial laser with spiral optical elements which are designed to give rise to a mode with angular factor N=1 and wherein modes with the lowest losses are depicted.

FIG. 21 corresponds to FIG. 20 but for a laser constructed and operative in accordance with the present invention, employing spiral optical elements, having angularly varying phase. It is evident that in the present invention the loss discrimination between the first mode and the rest of the modes is more than 20 percent even with a maximum aperture of 7 mm. Thus, in a laser according to the present invention, single mode operation (0,1) is easily established.

Further improvement of mode quality and mode discrimination may be expected in accordance with a preferred embodiment of the present invention when conventional spherical mirrors are replaced with aspherical optical elements, so as to obtain new shapes of modes such as an annular flattop mode.

Figure 22:
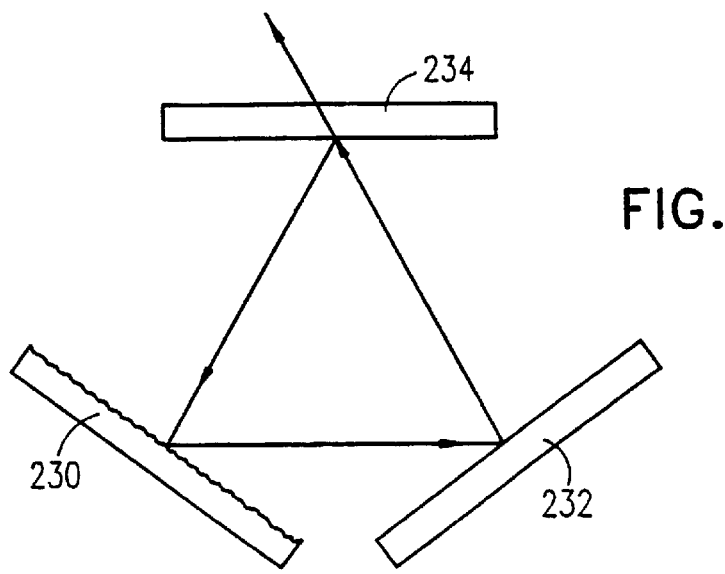
FIG. 22 is a schematic illustration of a ring laser having a single reflecting spiral optical element of the type illustrated in FIGS. 2–4 and two other optical elements which serve as reflecting mirrors and are operative in combination to reverse the angular phase of the mode.

Reference is now made to FIG. 22, which is a schematic illustration of a ring laser having a single reflecting spiral optical element 230 of the type illustrated in FIGS. 2–4. The ring laser of FIG. 22 also comprises at least one reflector 232 and one output coupler 234. At least one of the foregoing elements can be designed to introduce angular phase change according to the invention. The remaining elements element may remain conventional.

As an example, in the ring laser presented in FIG. 22 the reflector 230 is a spiral optical element that introduces angular phase changes. This spiral optical element reflects the mode at an off axis angle. Accordingly, a correction must be made and the shape of spiral optical element is elliptical rather than circular. Nevertheless, as previously described, the general principle of a single singularity point in the phase of elements which change the angular distribution of the incident wavefront, remains.

The spiral optical element 230 introduces a 2NΘ angular phase change whereas the other two elements 230 and 232 merely reverse the sign of the angular phase.

Figure 23:
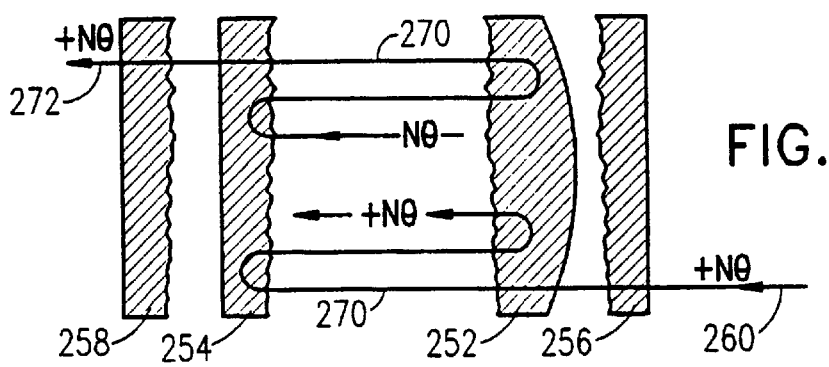
FIG. 23 is a simplified illustration of a Fabry Perot etalon designed to resolve both spatial and longitudinal modes which is constructed and operative in accordance with a preferred embodiment of the present invention.

The advantages of this ring configuration including spiral optical elements of the present invention, are the same as the advantages described for axial laser. Specifically, single mode operation, higher output power and better beam quality Reference is now made to FIG. 23, which illustrates a passive optical resonator, more specifically, a Fabry-Perot etalon designed to resolve both spatial and longitudinal modes, which is constructed and operative in accordance with a preferred embodiment of the present invention.

The Fabry-Perot etalon is commonly employed to discriminate between longitudinal modes in a multi-wavelength beam. The present invention makes it possible to employ this etalon to discriminate between transverse modes as well as longitudinal modes.

The etalon comprises two output couplers 252 and 254 and two external spiral optical elements 256 and 258. The output couplers 252 and 254 are preferably designed according to the configurations presented in FIGS. 5–7.

The angular phase change introduced by the first output coupler 252 is +2NΘ to a reflected wavefront and +NΘ to a transmitted one. The second output coupler 254 introduces the same phase change with opposite sign. The first external spiral optical element 256 introduces an angular phase changes of −NΘ and the second external spiral optical element 258 introduces +NΘ.

Both external spiral optical elements 256 and 258 are preferably coated with antireflection layers on both sides thereof. Alternatively an external spiral optical element and an output coupler can be combined into one element, as in the embodiment of FIG. 7. In such a combination, the phase of the external spiral optical element is added to the phase of the external surfaces of the output coupler as in the embodiment of FIG. 7.

In operation an incident beam 260 passes through the first external spiral optical element 256 and the first output coupler 252 without any phase change, because the effects of each of these elements on the phase of the beam cancel each other. Then, the internal beam is reflected back and forth between the internal surfaces of the etalon and modes 270 evolve.

As in the axial laser, divergence is low only for the mode with angular factor N. An output beam 272 emerges from the etalon without its phase having been changed by the second output coupler 254 and the second external spiral optical element 258. As a result only the component of the incident beam having an angular factor N will pass through the etalon.

Figure 24:
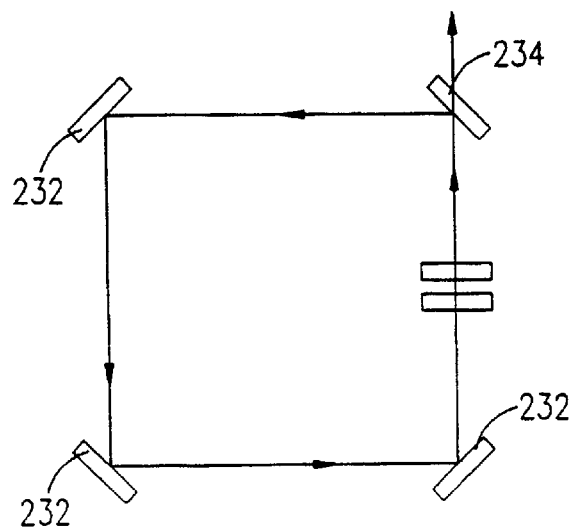
FIG. 24 is a schematic diagram of a conventional ring laser employing the etalon of FIG. 23.

This etalon can be employed to improve the performance of a conventional ring laser such as that shown in FIG. 24, without the need to replace the existing conventional optical elements thereof.

In order to evaluate the configuration of the modes and their losses in an arbitrary optical resonator, a new mathematical algorithm was developed by the present inventors. In this algorithm the wavefronts of the modes are sampled at a large number of locations and the sampled values are written as a vector or as a matrix. An optical element is represented as a diagonal tensor where every component describes the amplitude and phase change introduced by the element at a specific location.

Propagation of a wavefront from one plane to another is described by a tensor whose every component denotes the influence of each point in the original plane on each point on the other plane. The wave propagation and the optical elements are represented as a multiplication of tensors (or matrixes). The result of this multiplication is a tensor which represent the operator of the resonator. The eigen vectors of the operator are the modes of the resonator and the eigen values are the losses of the modes.

It is also possible to incorporate a spiral optical element into an optical resonator so as to obtain different light distributions at two different sections within the resonator.

Figure 25:
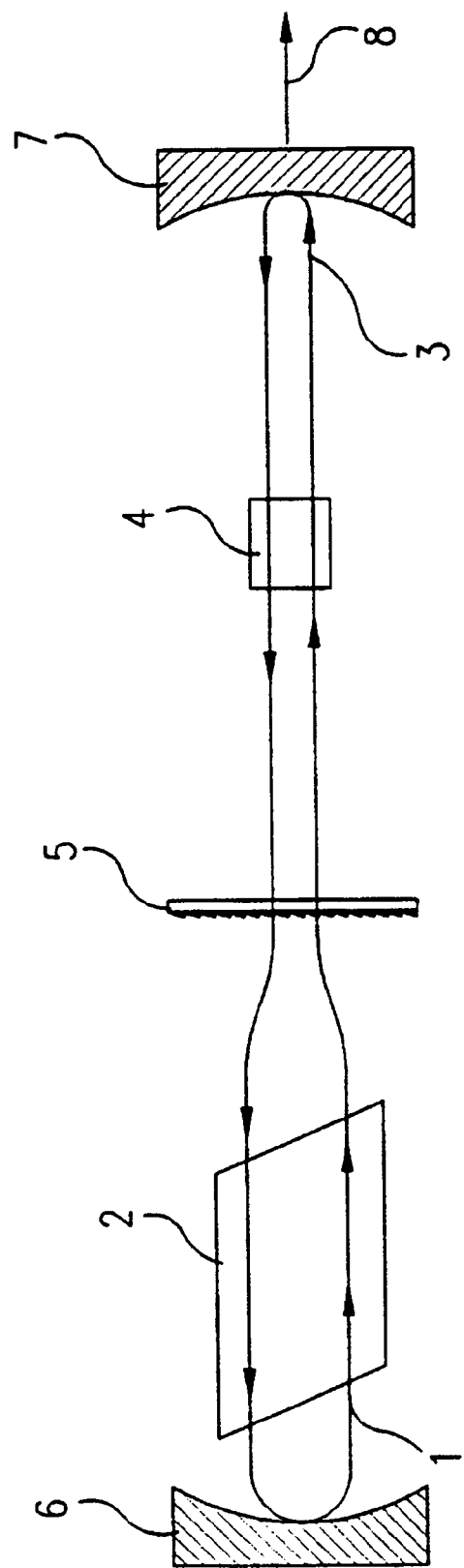
FIG. 25 presents a combination of laser components in which a spiral optical element is incorporated into an optical resonator so as to obtain a certain light distribution at one section within the resonator, and a different distribution in the remaining section.

Consider, for example, the axial laser configuration of FIG. 25 which includes a gain medium, a nonlinear medium for doubling the frequency of the laser light and a spiral optical element. In this configuration two different distributions of the same mode occur on either sides of the spiral element. Each distribution is characterized by a different angular phase. One distribution 1 is broad so as to efficiently fill the entire gain medium 2 which could be Nd:YAG crystal, and the other distribution 3 is narrow, and consequently concentrated and intense, in order to obtain efficient second harmonic generation from the nonlinear medium 4, which could be a KTP crystal.

To achieve the desired distributions a spiral optical 5 element is placed at an arbitrary point inside the laser cavity, between the gain medium 2 and the nonlinear medium 4. Also the reflector mirror 6 is either a spiral optical element or an element which reverses the angular phase of the incident mode. The output coupler 7 in such a configuration, is a conventional element. The output beam 8, from the such a configuration with spiral elements, has higher power and better quality then would be obtained from a conventional configuration. If spiral optical element 5 is placed at the image plane of the reflector mirror 6 then the output beam 8 would have a perfect Gaussian distribution.

It will be appreciated by persons skilled in the art that the present invention is not limited by what has been particularly shown and described hereinabove. Rather the scope of the present invention is defined only by the claims which follow:

We claim:

1. An optical resonator comprising at least one static spiral optical element operative to change the angular phase distribution of modes in said optical resonator, thereby to generally eliminate undesirable modes.

2. An optical resonator according to claim 1 and wherein said at least one spiral optical element comprises a pair of spiral optical elements providing opposite angular phase changes to said modes.

3. An optical resonator according to claim 1 and also comprising at least one element that reverses the angular phase of an incident mode.

4. An optical resonator according to claim 3 and wherein said at least one element that reverses the angular phase of an incident mode comprises a phase conjugate mirror.

5. An optical resonator according to claim 3 and wherein said at least one element that reverses the angular phase of an incident mode comprises a V-shaped reflector.

6. An optical resonator according to claim 3 and wherein said at least one element that reverses the angular phase of an incident mode comprises a prism.

7. An optical resonator according to claim 3 and wherein said at least one element that reverses the angular phase of an incident mode comprises a cylindrical lens.

8. An optical resonator according to claim 3 and wherein said at least one element that reverses the angular phase of an incident mode comprises a cylindrical resonator.

9. An optical resonator according to claim 1 wherein said at least one spiral element is located at an arbitrary point inside the resonator so as to include at least two different light distributions within the resonator.

10. An optical resonator according to claim 1 and being an axial laser.

11. An optical resonator according to claim 1 and being a ring laser.

12. An optical resonator according to claim 1 and being an unstable laser.

13. An optical resonator according to claim 1 and being a stable laser.

14. An optical resonator according to claim 1 and being a laser.

15. An optical resonator according to claim 1 and being a passive optical resonator.

16. An optical resonator according to claim 1 and wherein at least one spiral optical element is embodied in at least one reflector.

17. An optical resonator according to claim 1 and wherein at least one spiral optical element is positioned adjacent at least one reflector.

18. An optical resonator according to claim 1 and wherein at least one spiral optical element is embodied in an output coupler.

19. An optical resonator according to claim 1 and wherein at least one spiral optical element is positioned adjacent an output coupler.

20. An optical resonator according to claim 1 and wherein said at least one spiral optical element provides angular phase change as well as at least one of linear and radial phase change.

21. An optical resonator according to claim 1 and also comprising an external spiral optical surface operative to cancel distortions and to eliminate angular phase variations in an output beam from said optical resonator.

22. A method of changing the angular phase distribution of modes in an optical resonator, thereby eliminating undesirable modes therein, by incorporating at least one static spiral optical element into said resonator.

23. The method of claim 22, and wherein said resonator is an active resonator.

24. The method of claim 22, and wherein said resonator is a passive resonator.

25. The method of claim 22, and also comprising the step of embodying said spiral optical element in at least one reflector.

26. The method of claim 22, and also comprising the step of positioning said spiral optical element adjacent to at least one reflector.

27. The method of claim 22, and wherein said spiral optical element is static.

* * * * *

UNITED STATES PATENT AND TRADEMARK OFFICE
CERTIFICATE OF CORRECTION

PATENT NO.   : 6,134,259
DATED        : October 17, 2000
INVENTOR(S)  : Yochay Danziger; Eriz Hasman; Nir Davidson and Asher A. Friesem It is certified that error appears in the above-identified patent and that said Letters Patent is hereby corrected as shown below:

Title page, [75] Inventors, Please add -- ASHER A. FRIESEM --.

Signed and Sealed this

Seventeenth Day of July, 2001

Attest:

NICHOLAS P. GODICI
Attesting Officer   Acting Director of the United States Patent and Trademark Office